US012798992B1

(12) United States Patent
Omran et al.

(10) Patent No.: US 12,798,992 B1
(45) Date of Patent: Nov. 17, 2026

(54) $CoO/CaSiO_3@g\text{-}C_3N_4$ NANOCOMPOSITE MATERIAL

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/256,004

(22) Filed: Jun. 30, 2025

(51) Int. Cl.
*C01G 51/04* (2025.01)
*C01B 21/06* (2006.01)
*C01B 33/24* (2006.01)

(52) U.S. Cl.
CPC .......... *C01G 51/04* (2013.01); *C01B 21/0605* (2013.01); *C01B 33/24* (2013.01); *C01P 2002/72* (2013.01); *C01P 2002/90* (2013.01); *C01P 2004/04* (2013.01); *C01P 2004/62* (2013.01); *C01P 2004/82* (2013.01); *C01P 2006/12* (2013.01); *C01P 2006/14* (2013.01); *C01P 2006/16* (2013.01)

(58) Field of Classification Search
CPC ..... C01G 51/04; C01B 21/0605; C01B 33/24; C01P 2002/72; C01P 2002/90; C01P 2004/04; C01P 2004/62; C01P 2004/82; C01P 2006/12; C01P 2006/14; C01P 2006/16
See application file for complete search history.

(56) References Cited

FOREIGN PATENT DOCUMENTS

| | | |
|---|---|---|
| CN | 115515900 A | 12/2022 |
| CN | 118807808 A | 10/2024 |

OTHER PUBLICATIONS

Guo et al. "Facile fabrication of a CoO/g-C3N4 p-n heterojunction with enhanced photocatalytic activity and stability for tetracycline degradation under visible light" Catalysis Science & Technology, vol. 7, Issue 15, Jun. 30, 2017, pp. 3325-2221 (Year: 2017).*

(Continued)

*Primary Examiner* — Anthony J Zimmer
*Assistant Examiner* — Syed T Iqbal
(74) *Attorney, Agent, or Firm* — Oblon, McClelland, Maier & Neustadt, L.L.P.

(57) ABSTRACT

A $CoO/CaSiO_3@g\text{-}C_3N_4$ nanocomposite material includes hexagonal metal oxide nanoparticles including a cobalt oxide (CoO) phase and a calcium silicate ($CaSiO_3$) phase dispersed on a matrix of graphitic carbon nitride ($g\text{-}C_3N_4$) nanosheets. The hexagonal metal oxide nanoparticles have an average particle diameter in a range from 340 to 430 nanometers (nm). The $CoO/CaSiO_3@g\text{-}C_3N_4$ nanocomposite material has the Brunauer-Emmett-Teller (BET) surface area greater than or equal to 20 square meters per gram ($m^2 \cdot g^{-1}$).

20 Claims, 4 Drawing Sheets

(56) References Cited

OTHER PUBLICATIONS

H.H.A. Sherif, et al., "The impact of cobalt oxide additions and heat treatment on wollastonite for magnetic applications", Ceramics International, vol. 50, Issue 22, Part B, Sep. 10, 2024, pp. 46962-46972, Excerpts only, 7 pages.
Guangyuan Yao, et al.,"Synthesis and enhanced visible-light photocatalytic activity of wollastonite/g-C3N4 composite", Materials Research Bulletin, vol. 86, Feb. 2017, pp. 186-193, Excerpts only, 8 pages.
Wenqiang Zhang, et al., "Fabrication of ternary CoO/g-C3N4/Co3O4 nanocomposite with p-n-p type heterojunction for boosted visible-light photocatalytic performance", Journal of Chemical Technology & Biotechnology, vol. 96, Issue 7, Feb. 23, 2021, pp. 1854-1863, Excerpts only, 24 pages.

* cited by examiner

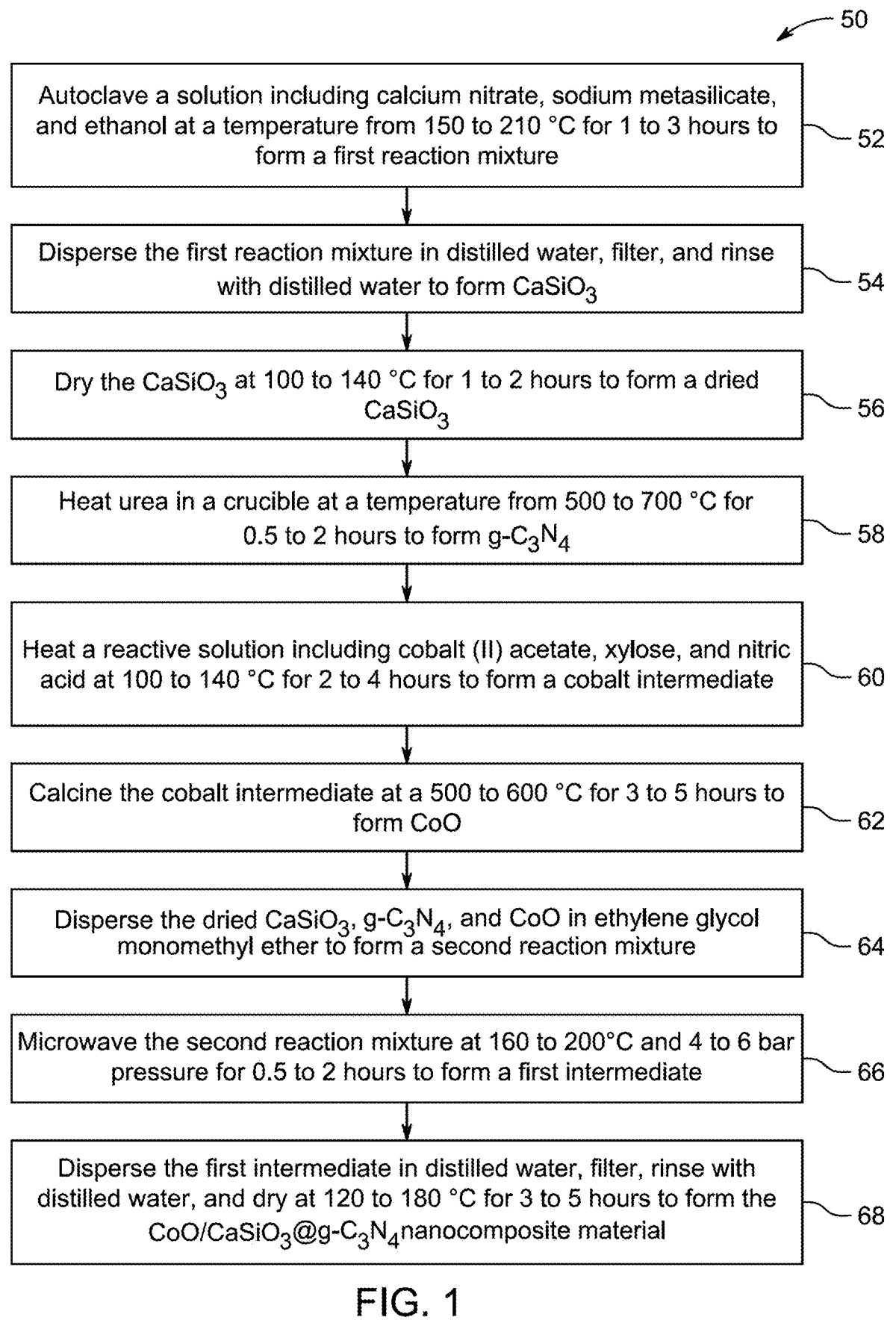

50

Autoclave a solution including calcium nitrate, sodium metasilicate, and ethanol at a temperature from 150 to 210 °C for 1 to 3 hours to form a first reaction mixture — 52

↓

Disperse the first reaction mixture in distilled water, filter, and rinse with distilled water to form $CaSiO_3$ — 54

↓

Dry the $CaSiO_3$ at 100 to 140 °C for 1 to 2 hours to form a dried $CaSiO_3$ — 56

↓

Heat urea in a crucible at a temperature from 500 to 700 °C for 0.5 to 2 hours to form g-$C_3N_4$ — 58

↓

Heat a reactive solution including cobalt (II) acetate, xylose, and nitric acid at 100 to 140 °C for 2 to 4 hours to form a cobalt intermediate — 60

↓

Calcine the cobalt intermediate at a 500 to 600 °C for 3 to 5 hours to form CoO — 62

↓

Disperse the dried $CaSiO_3$, g-$C_3N_4$, and CoO in ethylene glycol monomethyl ether to form a second reaction mixture — 64

↓

Microwave the second reaction mixture at 160 to 200°C and 4 to 6 bar pressure for 0.5 to 2 hours to form a first intermediate — 66

↓

Disperse the first intermediate in distilled water, filter, rinse with distilled water, and dry at 120 to 180 °C for 3 to 5 hours to form the CoO/$CaSiO_3$@g-$C_3N_4$nanocomposite material — 68

FIG. 1

$CoO/CaSiO_3@g\text{-}C_3N_4$ NANOCOMPOSITE MATERIAL

BACKGROUND

Technical Field

The present disclosure is directed to a nanocomposite material, more particularly, a nanocomposite material including cobalt (II) oxide (CoO) and calcium silicate ($CaSiO_3$) nanoparticles dispersed on a matrix of graphitic carbon nitride ($g\text{-}C_3N_4$) nanosheets ($CoO/CaSiO_3@g\text{-}C_3N_4$).

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Carbon-based nanomaterials offer several advantages, including a high surface area for enhanced electrochemical applications, electrical conductivity for efficient charge transfer, and chemical stability [Ibrahim, T. G., et al., Eliminating Manifold Pharmaceutical Pollutants with Carbon Nanoparticles Driven via a Short-Duration Ball-Milling Process, *Surfaces,* 7, 3, 493-507]. Carbon-based nanomaterials are cost-effective and environmentally friendly. The performance of carbon-based materials in supercapacitors is improved by combining with materials like metal films or graphene [Khairy, M., et al., Enhancing the Conductivity and Dielectric Characteristics of Bismuth Oxyiodide via Activated Carbon Doping, *Molecules,* 29, 9, 2082]. The graphitic carbon nitride ($g\text{-}C_3N_4$) has enhanced properties as compared to activated carbon, including the ability to store charge using solar energy and broader light absorption due to its lower bandgap. The structural tunability of $g\text{-}C_3N_4$ through carbon-defect and two-dimensional engineering further enhances its performance. The modifications enhance porosity and surface area, making $g\text{-}C_3N_4$ a promising material for supercapacitors.

Several studies have demonstrated that the morphology of $g\text{-}C_3N_4$ nanostructures plays a role in determining the photocatalytic efficiency [Zhang, Y. W., et al., Porous graphitic carbon nitride synthesized via direct polymerization of urea for efficient sunlight-driven photocatalytic hydrogen production, *Nanoscale,* 2012, 4, 5300-5303]. Exfoliating bulk $g\text{-}C_3N_4$ into nanosheets through thermal oxidative etching has been found to enhance its photocatalytic performance [Niu, P., et al., Graphene-like carbon nitride nanosheets for improved photocatalytic activities, *Adv. Func. Mat., Volume* 22, Issue 22, 2012, pages 4763-4770; and Ren, J., et al., Thermal oxidative etching method derived graphitic $C_3N_4$: Highly efficient metal-free catalyst in the selective epoxidation of styrene, RSC Adv., 2017, 7, 5340-5348]. The duration of thermal oxidative etching strongly influences the surface chemistry and microstructure of $g\text{-}C_3N_4$[Su, Q., et al., Urea-derived graphitic carbon nitride as an efficient heterogeneous catalyst for $CO_2$ conversion into cyclic carbonates, *Catal. Sci. Technol.,* 2014, 4, 1556-1562]. Moreover, the photocatalytic activity of $g\text{-}C_3N_4$ varies depending on the precursor used for its synthesis [Dong, H., et al., Synthesis of $g\text{-}C_3N_4$ by different precursors under burning explosion effect and its photocatalytic degradation for tylosin, *Applied Catalysis B: Environmental,* Volume 230, 2018, pages 65-76]. Therefore, selecting an appropriate precursor optimizes $g\text{-}C_3N_4$ photocatalytic properties. Typically, bulk $g\text{-}C_3N_4$ is synthesized using urea, melamine, dicyandiamide, or melamine as precursors. Composite materials, formed by combining distinct components, exhibit improved properties due to the interaction of distinct components.

The integration of multifunctional nanocomposites revolutionized industrial and environmental applications due to enhanced physicochemical properties. Nanocomposites included at least two phases, with a reinforcing phase embedded within a matrix phase of metal, ceramic, or polymer elements, exhibiting enhanced functionality and multifunctional properties compared to single-component counterparts. Furthermore, the integration of multiple functional phases into a single nanocomposite structure generated synergistic effects that enhanced overall performance, resulting in enhanced surface area, adsorption capacity, and ion-exchange capabilities. Despite these advantages, phase instability, limited compositional uniformity, and high production costs restricted widespread adoption. Therefore, addressing these challenges requires advanced fabrication techniques and innovative material design strategies.

Presently, research has shifted toward the exploration of various nanostructures, particularly those based on metal oxides, carbonates, and hydroxides. These nanostructures exhibit tailored properties that enhance their applicability in fields such as catalysis, environmental remediation, and electrochemical energy storage. Research efforts have emphasized the synthesis of materials with high reactivity, stability, and functional adaptability. However, conventional synthesis techniques present challenges such as inconsistent particle size distribution, poor morphological control, and limited compositional uniformity. Single-phase and binary nanomaterials often lack the multifunctionality required for high-performance applications. Additionally, high production costs, complex synthesis procedures, and energy-intensive processing hinder scalability. Addressing these challenges requires optimizing synthesis parameters, improving phase distribution control, and integrating hybrid fabrication approaches.

Accordingly, it is one object of the present disclosure to provide a nanocomposite material that may circumvent the above-listed drawbacks and limitations of the materials known in the art.

SUMMARY

In an exemplary embodiment, a $CoO/CaSiO_3@g\text{-}C_3N_4$ nanocomposite material including hexagonal metal oxide nanoparticles includes a cobalt oxide (CoO) phase and a calcium silicate ($CaSiO_3$) phase dispersed on a matrix of graphitic carbon nitride ($g\text{-}C_3N_4$) nanosheets. The hexagonal metal oxide nanoparticles have an average particle diameter ranging from 340 to 430 nanometers (nm). The $CoO/CaSiO_3@g\text{-}C_3N_4$ nanocomposite material has the Brunauer-Emmett-Teller (BET) surface area greater than or equal to 20 square meters per gram ($m^2 \cdot g^{-1}$).

In some embodiments, the $CoO/CaSiO_3@g\text{-}C_3N_4$ nanocomposite material has the BET surface area greater than or equal to 25 $m^2 \cdot g^{-1}$.

In some embodiments, the $CoO/CaSiO_3@g\text{-}C_3N_4$ nanocomposite material has the BET surface area greater than or equal to 30 $m^2 \cdot g^{-1}$.

In some embodiments, the $CoO/CaSiO_3@g\text{-}C_3N_4$ nanocomposite material has a pore volume greater than or equal to 0.10 cubic centimeters per gram ($cm^3 \cdot g^{-1}$).

In some embodiments, the $CoO/CaSiO_3@g\text{-}C_3N_4$ nanocomposite material has a pore volume greater than or equal to 0.15 $cm^3 \cdot g^{-1}$.

In some embodiments, the $CoO/CaSiO_3@g\text{-}C_3N_4$ nanocomposite material has a pore volume greater than or equal to 0.195 $cm^3 \cdot g^{-1}$.

In some embodiments, the $CoO/CaSiO_3@g\text{-}C_3N_4$ nanocomposite material has an average pore diameter of 21.82 nm.

In some embodiments, the hexagonal metal oxide nanoparticles have an average particle diameter ranging from 370 to 410 nm.

In some embodiments, the hexagonal metal oxide nanoparticles have an average particle diameter ranging from 380 to 400 nm.

In another exemplary embodiment, a method for making the $CoO/CaSiO_3@g\text{-}C_3N_4$ nanocomposite material is described. The method includes autoclaving a solution including calcium nitrate ($Ca(NO_3)_2$), sodium metasilicate ($Na_2SiO_3$), and ethanol ($C_2H_5OH$) at a temperature from 150 to 210 degrees Celsius (° C.) for 1 to 3 hours (h) to form a first reaction mixture. The method further includes dispersing the first reaction mixture in distilled water, filtering, and rinsing with distilled water to form $CaSiO_3$. The method further includes drying the $CaSiO_3$ at 100 to 140° C. for 1 to 2 h to form a dried $CaSiO_3$ and heating urea ($NH_2CONH_2$) in a crucible at a temperature from 500 to 700° C. for 0.5 to 2 h to form $g\text{-}C_3N_4$. The method further includes heating a reactive solution including cobalt (II) acetate ($C_4H_6CoO_4$), xylose ($C_5H_{10}O_5$), and nitric acid ($HNO_3$) at 100 to 140° C. for 2 to 4 h to form a cobalt intermediate. The method further includes calcining the cobalt intermediate at 500 to 600° C. for 3 to 5 h to form CoO and dispersing the dried $CaSiO_3$, $g\text{-}C_3N_4$, and CoO in ethylene glycol monomethyl ether to form a second reaction mixture. The method further includes microwaving the second reaction mixture at 160 to 200° C. and 4 to 6 bar pressure for 0.5 to 2 h to form a first intermediate. The method further includes dispersing the first intermediate in distilled water, filtering, rinsing with distilled water, and finally drying at 120 to 180° C. for 3 to 5 h to form the $CoO/CaSiO_3@g\text{-}C_3N_4$ nanocomposite material.

In some embodiments, the concentration of $Ca(NO_3)_2$ in the first reaction mixture is in a range from 0.1 to 10 g/L.

In some embodiments, the concentration of sodium metasilicate in the first reaction mixture is in a range from 0.1 to 10 g/L.

In some embodiments, the concentration of $C_2H_5OH$ in the first reaction mixture is in a range from 400 to 600 milliliters per litre (ml/L).

In some embodiments, the urea ($NH_2CONH_2$) is heated in the crucible at a temperature of 600° C. for 45 minutes (min).

In some embodiments, the concentration of $C_4H_6CoO_4$ in the reactive solution mixture is in a range from 80 to 100 grams per litre (g/L).

In some embodiments, the concentration of $C_5H_{10}O_5$ in the reactive solution mixture is in a range from 35 to 55 g/L.

In some embodiments, the concentration of $HNO_3$ in the reactive solution mixture is in a range from 80 to 100 ml/L.

In some embodiments, the cobalt intermediate is calcined at 550° C. for 4 h to form COO.

In some embodiments, the second reaction mixture is microwaved at 180° C. and 5 bar pressure.

In some embodiments, the second reaction mixture is microwaved for 1 h.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is an exemplary flowchart of preparing a $CoO/CaSiO_3@g\text{-}C_3N_4$ nanocomposite material via a simple precipitation method, according to certain embodiments.

DETAILED DESCRIPTION

Figure 2:
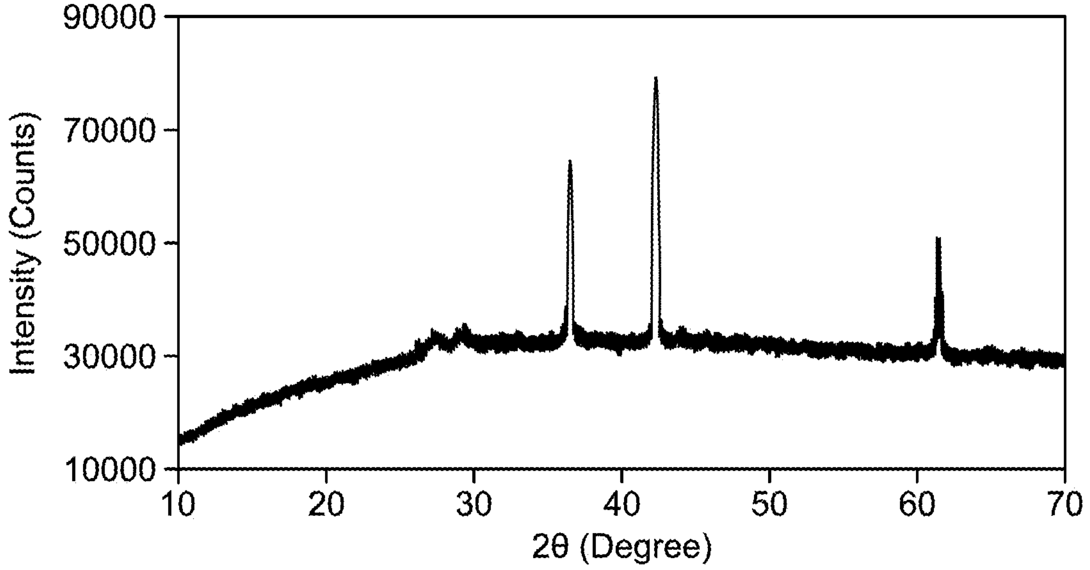
FIG. 2 shows an X-ray diffraction (XRD) diffractogram of the $CoO/CaSiO_3@g\text{-}C_3N_4$ nanocomposite material, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present disclosure.

As used herein, the term 'nanocomposite' refers to a composite material that has at least one component with a grain size measured in nanometers.

As used herein, the term 'nanocomposite material' is a multiphase material where at least one component has nanoscale dimensions (1-1000 nm). These materials combine a matrix (polymer, metal, or ceramic) with nanostructured fillers, enhancing properties such as strength, conductivity, and thermal stability, making them useful in advanced applications like electronics, energy storage, and biomedical engineering.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a useful parameter in characterizing the porous structure of materials, such as adsorbents or catalysts.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

A $CoO/CaSiO_3@g\text{-}C_3N_4$ nanocomposite material is described. The nanocomposite material includes hexagonal metal oxide nanoparticles of CoO and a $CaSiO_3$ dispersed on a matrix of graphitic carbon nitride ($g\text{-}C_3N_4$) nanosheets. In a preferred embodiment, the nanocomposite has a structure including a dispersion of hexagonal metal oxide nanoparticles, including a cobalt (II) oxide (CoO) phase and a calcium silicate ($CaSiO_3$) phase on a two-dimensional porous structure, including curled and wrinkled nanosheets and platelets of the $g\text{-}C_3N_4$. The hexagonal metal oxide nanoparticles have an average particle diameter in a range from 300 to 500 nanometers (nm), preferably 340 to 430 nm, preferably 350 to 420 nm, preferably 360 to 415 nm, preferably 370 to 410 nm, preferably 375 to 405 nm preferably 380 to 400 nm.

In some embodiments, the hexagonal metal oxide nanoparticles have an average particle diameter ranging from 380 to 400 nm, preferably 381 to 399 nm, preferably 382 to 398 nm, preferably 383 to 397 nm, preferably 384 to 396 nm, preferably 385 to 394 nm, preferably 386 to 392 nm. In a preferred embodiment, hexagonal metal oxide nanoparticles have an average particle diameter of 387 nm.

In one or more embodiments, the $CoO/CaSiO_3@g\text{-}C_3N_4$ nanocomposite material has a mass ratio of the $CoO:CaSiO_3:g\text{-}C_3N_4$ phases in a range from 0.25-10:0.25-10:0.25:10, preferably 0.5-7.5:0.5-7.5:0.5-7.5, preferably 1-5:1-5:1-5.

A porous material forms a porous bulk solid. Pores may be micropores, mesopores, macropores, and/or a combination thereof. The pores exist in the bulk material, not always in the molecular structure of the material. The term 'microporous' typically means that nanocomposite have pores with an average pore width (i.e. diameter) of less than 2 nm. The term 'mesoporous' typically means the pores of the nanocomposite have an average pore width of 2-50 nm. The term 'macroporous' typically means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, the $CoO/CaSiO_3@g\text{-}C_3N_4$ nanocomposite material has a Brunauer-Emmett-Teller (BET) surface area greater than or equal to 12.5 square meters per gram ($m^2 \cdot g^1$), preferably greater than or equal to 20 $m^2 \cdot g^1$, preferably greater than or equal to 25 $m^2 \cdot g$ 1, preferably greater than or equal to 30 $m^2 \cdot g^1$. In a preferred embodiment, the $CoO/CaSiO_3@g\text{-}C_3N_4$ nanocomposite material has a BET surface area of 30.68 $m^2 \cdot g^1$. The BET hypothesis is the foundation for an analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the $CoO/CaSiO_3@g\text{-}C_3N_4$ nanocomposite material has a pore volume greater than or equal to 0.075 cubic centimeters per gram ($cm^3 \cdot g^{-1}$), preferably greater than or equal to 0.10 $cm^3 \cdot g^{-1}$, preferably greater than or equal to 0.125 $cm^3 \cdot g^{-1}$, preferably greater than or equal to 0.15 $cm^3 \cdot g^{-1}$, preferably greater than or equal to 0.175 $cm^3 \cdot g^{-1}$, preferably greater than or equal to 0.195 $cm^3 \cdot g^{-1}$. In a preferred embodiment, the $CoO/CaSiO_3@g\text{-}C_3N_4$ nanocomposite material has a pore volume equal to 0.198 $cm^3$ $g^{-1}$.

In some embodiments, the average pore distribution of the nanocomposite may include, but is not limited to, crystalline average pore distribution, bimodal, trimodal, multimodal, narrow, broad, and Gaussian. In a preferred embodiment, the average pore distribution of nanocomposite is unimodal, indicating one pore size population within the material. In one or more embodiments, the nanocomposite material has an average pore diameter in a range from 10 to 30 nm. In a preferred embodiment, the $CoO/CaSiO_3@g\text{-}C_3N_4$ nanocomposite material has an average pore diameter of 21.82 nm.

Aspects of this disclosure are directed to the making of a $CoO/CaSiO_3@g\text{-}C_3N_4$ nanocomposite material. FIG. 1 illustrates a flow chart of a method 50 of preparing the $CoO/CaSiO_3$@g-$C_3N_4$ nanocomposite material via a precipitation method. The precipitation method is a widely used and straightforward technique for synthesizing nanomaterials, particularly metal oxides, hydroxides, and composite materials. The above mentioned method involves the controlled formation of solid particles from a solution through chemical reactions that lead to supersaturation and subsequent nucleation. Typically, a precursor solution containing metal salts is mixed with a precipitating agent, such as hydroxides, carbonates, or sulfides, under specific conditions of pH, temperature, and concentration. As the reaction proceeds, the solubility limit of the metal ions is exceeded, leading to the formation of insoluble nanoparticles that gradually settle out of the solution. The factors influencing precipitation include reaction kinetics, stirring rate, temperature, and the presence of surfactants or stabilizers, which help control particle size, morphology, and crystallinity. The precipitation method is highly advantageous due to its simplicity, cost-effectiveness, and scalability for large-scale production. Additionally, the precipitation process allows for precise control over material composition and purity, making it suitable for synthesizing advanced functional materials such as catalysts, semiconductors, and nanocomposites. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes autoclaving a solution including calcium nitrate ($Ca(NO_3)_2$), sodium metasilicate ($Na_2SiO_3$), and ethanol ($C_2H_5OH$) at a temperature from 130 to 230 degrees Celsius (° C.), preferably 150 to 210° C., preferably 155 to 205° C., preferably 160 to 200° C., preferably 165 to 195° C. preferably 170 to 190° C., and preferably 175 to 185° C., for 0.5 to 4.5 hours (h), preferably 1 to 3 h, preferably 1.2 to 2.8 h, preferably 1.4 to 2.6 h, preferably 1.6 to 2.4 h, preferably 1.8 to 2.2 h to form a first reaction mixture. In a preferred embodiment, the solution including $Ca(NO_3)_2$, $Na_2SiO_3$, and $C_2H_5OH$ is autoclaved at a temperature of 180° C. for 2 h.

In some embodiments, the concentration of calcium nitrate in the first reaction mixture is in a range from 0.1 to 10 g/L. In some embodiments, the concentration of sodium metasilicate in the first reaction mixture is in a range from 0.1 to 10 g/L.

In some embodiments, the concentration of ethanol in the first reaction mixture is in a range from 300 to 700 mL/L, preferably 400 to 600 mL/L, still more preferably, 450 to 550 mL/L. In a preferred embodiment, the concentration of ethanol in the first reaction mixture is 500 ml/L.

Autoclaving is a widely used technique in hydrothermal and solvothermal synthesis, where materials are subjected to high pressure and temperature in a sealed autoclave reactor to promote crystal growth, phase transformation, and improved structural properties. In this process, precursor solutions containing metal salts or other chemical reagents are placed in a teflon-lined stainless-steel autoclave and heated beyond the boiling point of the solvent, typically between 100° C. and 300° C. The elevated temperature and pressure create a unique reaction environment that enhances the solubility of reactants, accelerates nucleation, and enables the formation of well-defined nanostructures such as nanorods, nanowires, nanotubes, and hierarchical composites. The autoclaving method is particularly advantageous for synthesizing high-purity and uniform nanoparticles with controlled morphology, crystallinity, and size distribution. Additionally, it allows for the growth of metastable phases that are difficult to achieve under ambient conditions.

At step 54, the method 50 includes dispersing the first reaction mixture in distilled water, filtering, and rinsing with distilled water to form $CaSiO_3$. The salts may be dispersed in distilled water either manually or via stirring, swirling, mixing, sonication, ultrasonication or a combination thereof. In a preferred embodiment, an ultrasonic bath was used for the dispersion of the reaction mixture. After dispersion, the first reaction mixture is subjected to filtration. The filtration can be done by gravity filtration, centrifugation, hot filtration, cold filtration, granular media filtration, mechanical filtration, multilayer filtration, and vacuum filtration. In a preferred embodiment, the first reaction mixture is subjected to vacuum filtration using a Buchner funnel. The solids retained after filtration are washed/rinsed with water. The water may be tap water, distilled water, bidistilled water, deionized water, deionized distilled water, reverse osmosis water, and/or some other water. In a preferred embodiment, the water is distilled water.

At step 56, the method 50 includes drying the $CaSiO_3$ at 80 to 160° C., preferably 100 to 140° C., preferably 105 to 135° C., preferably 110 to 130° C., and preferably 115 to 125° C. for 0.5 to 3 h, preferably 1 to 2 h to form a dried $CaSiO_3$. As the water content decreases, the remaining components concentrate and solidify into a fine powder. The above technique can utilize heating or vacuum conditions to accelerate the evaporation process, leaving behind a dry powder.

At step 58, the method 50 includes heating urea ($NH_2CONH_2$) in a crucible to form g-$C_3N_4$ at a temperature from 400 to 800° C., preferably 500 to 700° C., preferably 510 to 690° C., preferably 520 to 680° C., preferably 530 to 670° C., preferably 540 to 660° C., preferably 550 to 650° C., preferably 560 to 640° C., preferably 570 to 630° C., preferably 580 to 620° C., and preferably 590 to 610° C. for 0.25 to 4 h, preferably 0.5 to 2 h, preferably 0.6 to 1.9 h, and preferably 0.7 to 1.8 h. In a preferred embodiment, heat $NH_2CONH_2$ in a crucible to form g-$C_3N_4$ at a temperature of 600° C. for 0.75 h. The crucible provides a controlled environment for uniform heating, providing efficient decomposition and the formation of a nitrogen-rich carbon structure useful for photocatalytic, electrochemical, and other applications.

At step 60, the method 50 includes heating a reactive solution including cobalt (II) acetate ($C_4H_6CoO_4$), xylose ($C_5H_{10}O_5$), and nitric acid ($HNO_3$) to form a cobalt intermediate at 95 to 160° C., preferably 100 to 140° C., preferably 105 to 135° C., preferably 110 to 130° C., and preferably 115 to 125° C. for 1 to 5 h, preferably 2 to 4 h, preferably 2.2 to 3.8 h, preferably 2.4 to 3.6 h, preferably 2.6 to 3.4 h, and preferably 2.8 to 3.2 h. In a preferred embodiment, the reactive solution including $C_4H_6CoO_4$, $C_5H_{10}O_5$, and $HNO_3$ is heated at 120° C. for 3 h to form the cobalt intermediate. In one or more embodiments, the concentration of $C_4H_6CoO_4$ in the reactive solution is in a range from 60 to 120 g/L, preferably 80 to 100 g/L, and the concentration of $C_5H_{10}O_5$ in the reactive solution is in a range from 25 to 65 g/L, preferably 35 to 55 g/L. In one or more embodiments, the concentration of $HNO_3$ in the reactive solution mixture is in a range from 40 to 140 ml/L, preferably 80 to 100 ml/L.

In some embodiments, other acids such as sulfuric acid ($H_2SO_4$), hydrochloric acid (HCl), and phosphoric acid ($H_3PO_4$) may also be used to facilitate the formation of a cobalt intermediate. The choice of acid depends on the desired reactivity and the final properties of the cobalt-based material. In a preferred embodiment, the acid used in the reaction to form the cobalt intermediate is nitric acid.

In some embodiments, organic carbon sources such as glucose or fructose may be used in the reaction, as they may provide carbon during the reaction. Sucrose (table sugar) is another option, as it may decompose under heating to provide carbon. Additionally, urea or citric acid may be used to introduce carbon and influence the formation of metal-carbon structures. The choice depends on the desired reaction conditions and the properties of the final cobalt-based intermediate. In a preferred embodiment, the carbon source used in the reaction to form the cobalt intermediate is xylose.

At step 62, the method 50 includes calcining the cobalt intermediate to form CoO at 400 to 700° C., preferably 500 to 600° C., preferably 510 to 590° C., preferably 520 to 580° C., preferably 530 to 570° C., preferably 540 to 560° C. for 1 to 6 h, preferably 3 to 5 h, preferably 3.2 to 4.8 h, preferably 3.4 to 4.6 h, preferably 3.6 to 4.4 h, and preferably 3.8 to 4.2 h. In a preferred embodiment, the cobalt intermediate is calcined at 550° C. for 4 h to form CoO. The calcination is carried out by heating it to a high temperature under a restricted supply of ambient oxygen. This is performed to remove impurities or volatile substances and to incur thermal decomposition. Typically, the calcination is carried out in a furnace preferably equipped with a temperature and atmosphere control system. This process leads to the formation of a cobalt intermediate, where $C_5H_{10}O_5$ acts as a carbon source, and $HNO_3$ may help facilitate the breakdown and transformation of the cobalt compound, forming a cobalt-based material or precursor for further reactions. The high temperature accelerates the reaction, promoting chemical transformations.

At step 64, the method 50 includes dispersing the dried $CaSiO_3$, g-$C_3N_4$, and CoO in ethylene glycol monomethyl ether to form a second reaction mixture. Different solvents that may be used for dispersing the dried $CaSiO_3$, g-$C_3N_4$, and CoO, include, for example, water, ethanol, acetone, toluene, dimethyl sulfoxide (DMSO), N-methyl-2-pyrrolidone (NMP), hexane, methanol, or any other glycol. In a preferred embodiment, the solvent used for dispersing the dried $CaSiO_3$, g-$C_3N_4$, and CoO is ethylene glycol monomethyl ether.

At step 66, the method 50 includes microwaving the second reaction mixture to form a first intermediate at 140 to 220° C., preferably 160 to 200° C., preferably 165 to 195° C., preferably 170 to 190° C., preferably 175 to 185° C., and a pressure of 3 to 7 bar, preferably 4 to 6 bar, preferably 4.2 to 5.8 bar, preferably 4.4 to 5.6 bar, preferably 4.6 to 5.4 bar, preferably 4.8 to 5.2 bar for 0.25 to 3 h, preferably 0.5 to 2 h, preferably 0.6 to 1.8 h, preferably 0.7 to 1.6 h, preferably 0.8 to 1.4 h, preferably 0.9 to 1.2 h. In a preferred embodiment, the second reaction mixture is microwaved at 180° C. and 5 bar pressure for 1 h to form the first intermediate.

At step 68, the method 50 includes dispersing the first intermediate in distilled water, filtering, rinsing with distilled water, and drying at a temperature of 100 to 200° C., preferably 120 to 180° C., preferably 125 to 175° C., preferably 130 to 170° C., preferably 135 to 165° C., preferably 140 to 160° C., preferably 145 to 155° C., preferably at a temperature of 150° C. for 0.5 to 5 h, preferably 1 to 3 h, preferably 1.2 to 2.8 h, preferably 1.4 to 2.6 h, preferably 1.6 to 2.4 h, preferably 1.8 to 2.2 h, preferably for 2 h to form the CoO/$CaSiO_3$@g-$C_3N_4$ nanocomposite material.

EXAMPLES

The following examples demonstrate the preparation of CoO/$CaSiO_3$@g-$C_3N_4$ nanocomposite material. The examples are provided solely for illustration and are not to be construed as limitations of the present disclosure, as many variations thereof are possible without departing from the spirit and scope of the present disclosure.

Example 1: Fabricating the $CaSiO_3$

Equal moles of calcium nitrate (0.5 g) and sodium metasilicate (0.37 g) were dispersed in 100 milliliters (mL) of ethanol:water (1:1) in a 150 mL glass beaker and sonicated for 15 minutes. The mixture was transferred to a 200 mL autoclave and then placed in an oven operated at 180° C. for 2 hours. The product was dispersed in 500 mL distilled water with an ultrasonic bath for 10 minutes, filtered via a Buchner system, rinsed with distilled water, and dried at 120° C. for 1 hour.

Example 2: Fabricating the g-$C_3N_4$

About 30 grams (g) of urea ($NH_2CONH_2$) was placed in a 250 milliliters (mL) porcelain crucible and covered with its porcelain cover, then the crucible and cover were wrapped with three layers of aluminum foil to reduce the $NH_2CONH_2$ loss to sublimation. The crucible was heated via a furnace set at 600° C. for 45 min.

Example 3: Fabricating the CoO

About 10 g of cobalt (II) acetate ($C_4H_6CoO_4$) and 5 g of xylose ($C_5H_{10}O_5$) were placed in a 500 mL beaker. 100 mL distilled water was added to the mixture and heated until a clear solution was obtained. 10 mL of concentrated nitric acid ($HNO_3$) was added to the mixture, which was then heated until the carbonization of $C_5H_{10}O_5$. The mixture was placed in an oven set at 120° C. for 3 h; the black product was milled in a mortar, placed in a 150 mL porcelain dish, and calcined at 550° C. for 4 h.

Example 4: Fabricating the CoO@$CaSiO_3$@g-$C_3N_4$

An equal amount of calcium silicate ($CaSiO_3$), graphitic carbon nitride (g-$C_3N_4$), and cobalt oxide (CoO) (0.5 grams each) was transferred to a mono wave-200 vial (G30), dispersed in 20 mL ethylene glycol monomethyl ether via an ultrasonic bath for 30 min. The vial was closed with its teflon cover and placed in the Anton-Baar Monowave-200 operated at 180° C. and 5 bar pressure for one hour. The product was dispersed in 1 L distilled water with an ultrasonic bath for 30 min, filtered via a Buchner system, rinsed with distilled water, and dried at 150° C. for 2 h.

X-ray diffraction (XRD) was used to examine the crystallinity and phase identification of the CoO/$CaSiO_3$@g-$C_3N_4$ nanocomposite material; the findings are shown in FIG. 2. The powder's high crystalline nature was shown by its sharp peaks and high-intensity values. CoO was present as a primary phase together with $CaSiO_3$ and g-$C_3N_4$ as minor phases, according to an analysis of the diffraction patterns using standard Joint Committee on Powder Diffraction Standards (JCPDS) cards. The sharp peaks located at 2θ values of 36.5°, 42.4°, 61.5°, 73.6°, and 77.5° were well used to index the CoO cubic phase. The obtained diffractions originated respectively from (111), (200), (220), (311), and (222) planes of the cubic phase of CoO (reference code number 01-071-1178). Weak diffractions at 2θ values of 27.6° and 28.9° were used to detect the $CaSiO_3$ phase (reference code number 01-084-0655). Traces of quartz silica ($SiO_2$) were detected at a 2θ value of 27.3° (reference code number 01-079-1911). The $g\text{-}C_3N_4$ diffractions were recorded at 61.4° (reference code number. 01-087-1526). $CoO/CaSiO_3@g\text{-}C_3N_4$ was successfully fabricated since no further phases were found.

Figure 3A:
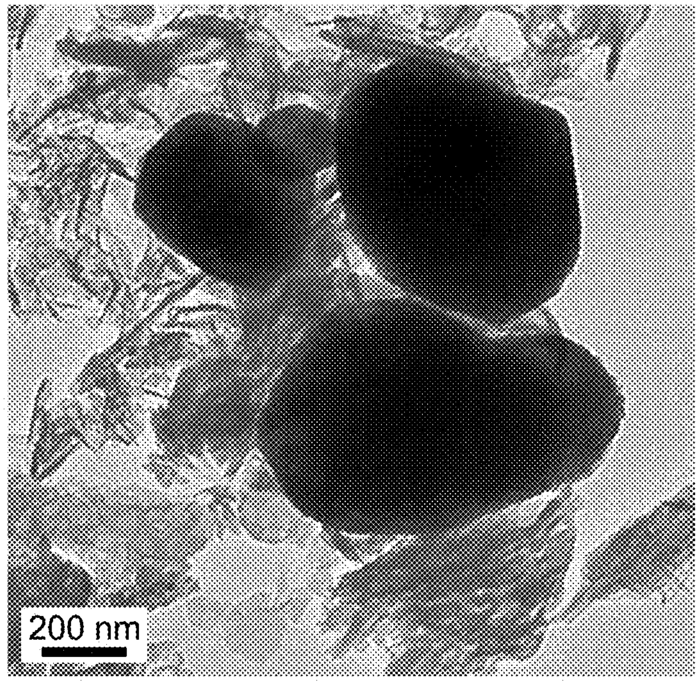
FIG. 3A shows a transmission electron microscopy (TEM) image of the $CoO/CaSiO_3@g\text{-}C_3N_4$ nanocomposite material, according to certain embodiments.
Figure 3B:
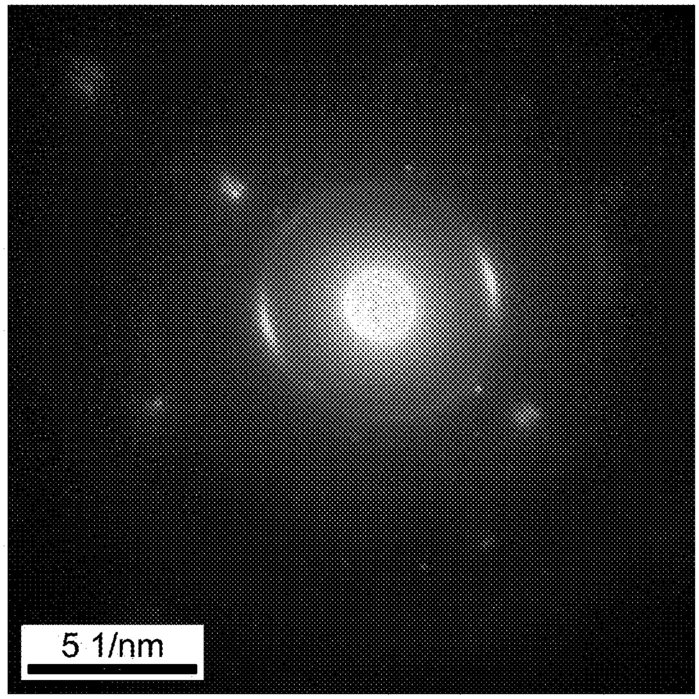
FIG. 3B shows a selected area electron diffraction (SAED) pattern of the $CoO/CaSiO_3@g\text{-}C_3N_4$ nanocomposite material, according to certain embodiments.

A transmission electron microscopy (TEM) image of $CoO/CaSiO_3@g\text{-}C_3N_4$ nanocomposite is presented in FIG. 3A. The TEM image shows that a two-dimensional porous structure is formed with curled and wrinkled nanosheets and platelets of the $g\text{-}C_3N_4$. The TEM image also shows good dispersion of homogeneous hexagonal-shaped metal oxide nanoparticles with a size of 387 nanometers (nm) on nanosheets of $g\text{-}C_3N_4$. FIG. 3B shows the corresponding selected area electron diffraction (SAED) pattern revealing diffraction spots with interplanar spacing of 0.288 nm, 0.256 nm, 0.186 nm, and 0.142 nm due to ($CaSiO_3$: 131), (CoO: 111, $CaSiO_3$: 022), ($CaSiO_3$: −2−32), and (CoO: 220, $CaSiO_3$: −330, $g\text{-}C_3N_4$; 221) diffraction planes, respectively.

Figure 4A:
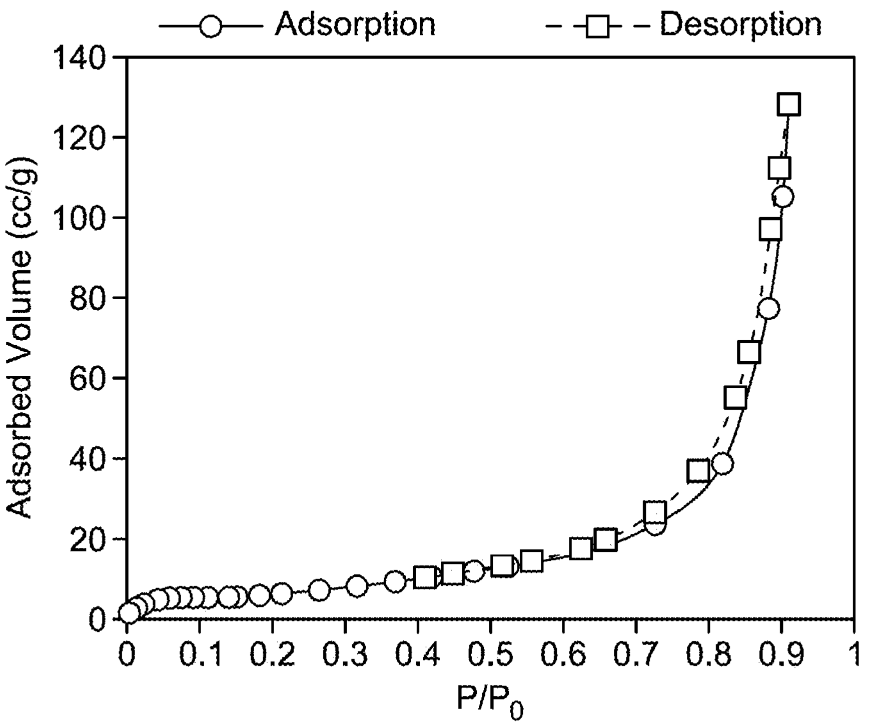
FIG. 4A shows a $N_2$ adsorption-desorption isotherm of the $CoO/CaSiO_3@g\text{-}C_3N_4$ nanocomposite material, according to certain embodiments.
Figure 4B:
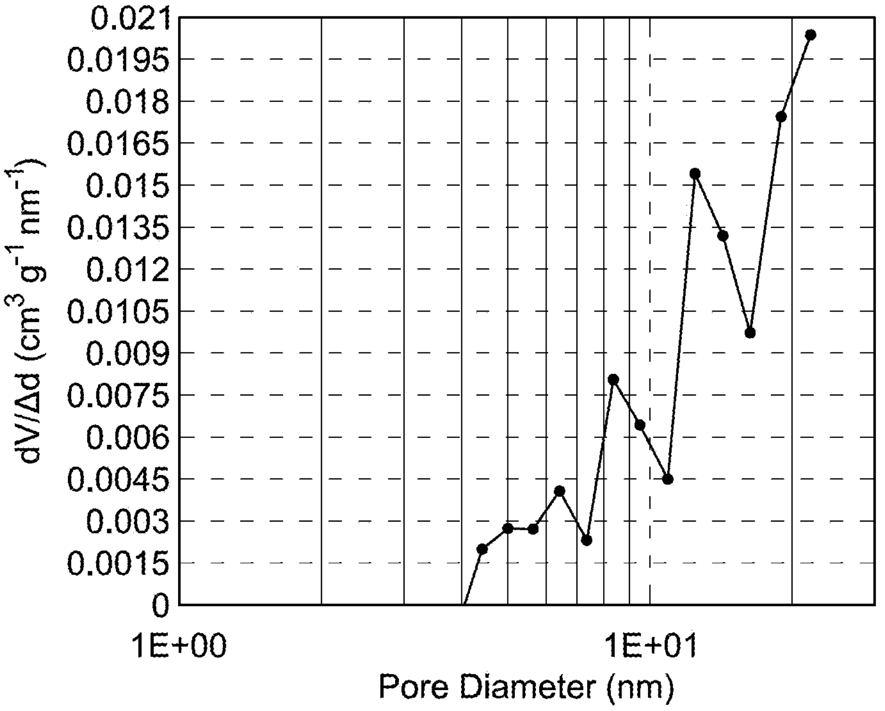
FIG. 4B shows the pore size distribution curves of the $CoO/CaSiO_3@g\text{-}C_3N_4$ nanocomposite material, plotted using the Barrett-Joyner-Halenda (BJH) method, according to certain embodiments.

FIG. 4A displays the nitrogen gas ($N_2$) adsorption-desorption isotherms of the $CoO/CaSiO_3@g\text{-}C_3N_4$ nanocomposite material. The nitrogen sorption isotherm of the composite belongs to type IV with a hysteresis loop, indicating the formation of mesoporous structures. However, shifting the loop to a relatively higher pressure (relative pressure ($P/P_0$)=0.66-1) indicates the presence of wide mesopores, which may result from the deposition of metal oxide particles in the wide pores of $g\text{-}C_3N_4$. Furthermore, the Brunauer-Emmett-Teller (BET) surface area of the $CoO/CaSiO_3@g\text{-}C_3N_4$ nanocomposite material was calculated to be 30.68 square meters per gram ($m^2\ g^{-1}$). The marked high specific surface area reflected the good dispersion of prepared metal oxide nanoparticles on $g\text{-}C_3N_4$. The pore size distribution curves were plotted using the Barrett-Joyner-Halenda (BJH) method (FIG. 4B) for the $CoO/CaSiO_3@g\text{-}C_3N_4$ sample, and exhibited unimodal distribution with average pore diameters maximized at 21.82 nm and a pore volume of 0.198 cubic centimeters ($cm^3\ g^{-1}$). All the isotherms belong to the category H3 type of pores, which do not exhibit limiting adsorption at high relative pressure ($P/P_0$), and arise due to aggregation of plate-like particles giving rise to slit-shaped pores. It was demonstrated that the assembly of the $CoO/CaSiO_3@g\text{-}C_3N_4$ nanocomposite material produced a mesoporous array.

Numerous modifications and variations of the present disclosure are possible in light of the above teachings. It is therefore to be understood that within the scope of the appended claims, the disclosure may be practiced otherwise than as specifically described herein.

The invention claimed is:

1. A $CoO/CaSiO_3@g\text{-}C_3N_4$ nanocomposite material, comprising:
   - hexagonal metal oxide nanoparticles comprising a cobalt oxide (CoO) phase and a calcium silicate ($CaSiO_3$) phase dispersed on a matrix of graphitic carbon nitride ($g\text{-}C_3N_4$ nanosheets),
   - wherein the hexagonal metal oxide nanoparticles have an average particle diameter in a range from 340 to 430 nanometers (nm), and
   - wherein the $CoO/CaSiO_3@g\text{-}C_3N_4$ nanocomposite material has the Brunauer-Emmett-Teller (BET) surface area greater than or equal to 20 square meters per gram ($m^2 \cdot g^{-1}$).

2. The $CoO/CaSiO_3@g\text{-}C_3N_4$ nanocomposite material of claim 1, wherein the $CoO/CaSiO_3@g\text{-}C_3N_4$ nanocomposite material has a BET surface area greater than or equal to 25 $m^2 \cdot g^{-1}$.

3. The $CoO/CaSiO_3@g\text{-}C_3N_4$ nanocomposite material of claim 2, wherein the $CoO/CaSiO_3@g\text{-}C_3N_4$ nanocomposite material has a BET surface area greater than or equal to 30 $m^2 \cdot g^{-1}$.

4. The $CoO/CaSiO_3@g\text{-}C_3N_4$ nanocomposite material of claim 1, wherein the $CoO/CaSiO_3@g\text{-}C_3N_4$ nanocomposite material has a pore volume greater than or equal to 0.10 cubic centimeters per gram ($cm^3 \cdot g^{-1}$).

5. The $CoO/CaSiO_3@g\text{-}C_3N_4$ nanocomposite material of claim 4, wherein the $CoO/CaSiO_3@g\text{-}C_3N_4$ nanocomposite material has a pore volume greater than or equal to 0.15 $cm^3 \cdot g^{-1}$.

6. The $CoO/CaSiO_3@g\text{-}C_3N_4$ nanocomposite material of claim 5, wherein the $CoO/CaSiO_3@g\text{-}C_3N_4$ nanocomposite material has a pore volume greater than or equal to 0.195 $cm^3 \cdot g^{-1}$.

7. The $CoO/CaSiO_3@g\text{-}C_3N_4$ nanocomposite material of claim 1, wherein the $CoO/CaSiO_3@g\text{-}C_3N_4$ nanocomposite material has an average pore diameter of 21.82 nanometers (nm).

8. The $CoO/CaSiO_3@g\text{-}C_3N_4$ nanocomposite material of claim 1, wherein the hexagonal metal oxide nanoparticles have an average particle diameter in a range from 370 to 410 nm.

9. The $CoO/CaSiO_3@g\text{-}C_3N_4$ nanocomposite material of claim 8, wherein the hexagonal metal oxide nanoparticles have an average particle diameter in a range from 380 to 400 nm.

10. A method for making the $CoO/CaSiO_3@g\text{-}C_3N_4$ nanocomposite material of claim 1, comprising:
    - autoclaving a solution comprising calcium nitrate, sodium metasilicate, and ethanol at a temperature from 150 to 210 degrees Celsius (° C.) for 1 to 3 hours (h) to form a first reaction mixture;
    - dispersing the first reaction mixture in distilled water, filtering, and rinsing with distilled water to form $CaSiO_3$;
    - drying the $CaSiO_3$; at 100 to 140° C. for 1 to 2 h to form a dried $CaSiO_3$;
    - heating urea ($NH_2CONH_2$) in a crucible at a temperature from 500 to 700° C. for 0.5 to 2 h to form $g\text{-}C_3N_4$;
    - heating a reactive solution comprising cobalt (II) acetate ($C_4H_6CoO_4$), xylose ($C_5H_{10}O_5$), and nitric acid ($HNO_3$) at 100 to 140° C. for 2 to 4 h to form a cobalt intermediate;
    - calcining the cobalt intermediate at a 500 to 600° C. for 3 to 5 h to form CoO;
    - dispersing the dried $CaSiO_3$, $g\text{-}C_3N_4$, and CoO in ethylene glycol monomethyl ether to form a second reaction mixture;
    - microwaving the second reaction mixture at 160 to 200° C. and 4 to 6 bar pressure for 0.5 to 2 h to form a first intermediate; and
    - dispersing the first intermediate in distilled water, filtering, rinsing with distilled water, and drying at 120 to 180° C. for 3 to 5 h to form the $CoO/CaSiO_3@g\text{-}C_3N_4$ nanocomposite material.

11. The method of claim 10, wherein the concentration of calcium nitrate ($Ca(NO_3)_2$) in the first reaction mixture is in a range from 0.1 to 10 g/L.

12. The method of claim 10, wherein the concentration of sodium metasilicate ($Na_2SiO_3$) in the first reaction mixture is in a range from 0.1 to 10 g/L.

13. The method of claim 10, wherein the concentration of ethanol ($C_2H_5OH$) in the first reaction mixture is in a range from 400 to 600 milliliters per litre (ml/L).

14. The method of claim 10, wherein $NH_2CONH_2$ is heated in the crucible at a temperature of 600° C. for 45 minutes (min).

15. The method of claim 10, wherein the concentration of cobalt (II) acetate ($C_4H_6CoO_4$) in the reactive solution mixture is in a range from 80 to 100 grams per litre (g/L).

16. The method of claim 10, wherein the concentration of xylose ($C_5H_{10}O_5$) in the reactive solution mixture is in a range from 35 to 55 g/L.

17. The method of claim 10, wherein the concentration of nitric acid ($HNO_3$) in the reactive solution mixture is in a range from 80 to 100 ml/L.

18. The method of claim 10, wherein the cobalt intermediate is calcined at 550° C. for 4 h to form CoO.

19. The method of claim 10, wherein the second reaction mixture is microwaved at 180° C. and 5 bar pressure.

20. The method of claim 10, wherein the second reaction mixture is microwaved for 1 h.

* * * * *